(12) United States Patent
Memory

(10) Patent No.: US 6,928,938 B2
(45) Date of Patent: Aug. 16, 2005

(54) METHOD OF CONVEYING PARTICULATE MATERIAL FROM AN AIR SEEDER HOPPER

(75) Inventor: Russell J. Memory, Saskatchewan (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 10/811,681

(22) Filed: Mar. 29, 2004

(65) Prior Publication Data

US 2004/0187754 A1 Sep. 30, 2004

Related U.S. Application Data

(62) Division of application No. 10/270,457, filed on Oct. 15, 2002, now Pat. No. 6,854,405.

(51) Int. Cl.⁷ .............................. A01C 7/00; A01C 9/00
(52) U.S. Cl. ....................................................... 111/173
(58) Field of Search ................................ 111/173, 170, 111/177–185, 200, 925; 221/211

(56) References Cited

U.S. PATENT DOCUMENTS

| 4,432,675 A | 2/1984 | Machnee |
| 4,503,803 A | 3/1985 | Barnes |
| 4,728,045 A | 3/1988 | Tomaszek |
| 5,375,541 A | * 12/1994 | McGann ..................... 111/162 |
| 5,375,778 A | 12/1994 | Lundquist |
| 5,592,889 A | 1/1997 | Bourgault |
| 5,913,399 A | * 6/1999 | Takemoto et al. .......... 194/200 |

* cited by examiner

Primary Examiner—Christopher J. Novosad
(74) Attorney, Agent, or Firm—Rebecca Henkel; Brant T. Maurer (57) ABSTRACT

An air seeder is provided having at least one container with a trough in the bottom floor. Preferably, the floor is formed with a v-shaped configuration converging at a metering mechanism. An auger is rotatably mounted in the trough to move particulate material to the metering mechanism located at a distal end of the container. The auger is powered by a motor mounted on the distal end of the auger opposite the metering mechanism. A remote fan mechanism is provided to deliver a supply of air to the metering mechanism through a pair of conveying tubes. Optionally, a sensor is provided to control the operation of the auger so that the auger only operates when it is needed.

20 Claims, 10 Drawing Sheets

METHOD OF CONVEYING PARTICULATE MATERIAL FROM AN AIR SEEDER HOPPER

CROSS REFERENCE TO RELATED APPLICATIONS

This Patent Application is a Divisional of U.S. patent application Ser. No. 10/270,457, filed on Oct. 15, 2002 now U.S. Pat. No. 6,854,405 entitled, "Internal Tank Augers for Air Seeder Hoppers" and having Russell J. Memory as the Applicant.

FIELD OF THE INVENTION

The present invention relates generally to an agricultural implement, such as an air cart forming part of an air seeding implement for planting seed and fertilizer into the ground. In particular, the present invention relates to the use of augers in low incline air seeder tanks to transfer product such as seed or fertilizer to a metering mechanism for disposition to the ground.

BACKGROUND OF THE INVENTION

Air carts for use on agricultural implements are well known. Typically, these air carts are used as part of an air seeder in which seeds, fertilizer and herbicides are deposited onto and into the ground during the planting operation. Air seeders and other seeding devices are commonly towed by tractors to apply seed or fertilizer, or both simultaneously, to a field. For example, an air seeder may be towed in combination with a tilling implement, one behind the other, to place the seed and fertilizer under the surface of the soil. Generally, air carts are in either a two container or three container configuration. The two container configuration is used to carry a supply of seeds and fertilizer for planting into the ground. The three container configuration can be used to carry an additional element, such as an herbicide, to be deposited on the ground. The three container configuration, however, can also be used to carry only one or two materials in whatever amounts are desired.

Air seeders also typically include a metering system for dispensing product from the tanks and a pneumatic distribution system for delivering the product from the tank to the soil. The tanks of the air seeders are formed with bottom surfaces that slope downward at the angle of repose for the product toward the metering mechanism. Gravity, in combination with the vibrations and movement of the air seeder, act to move the grain from the perimeter of the tank toward the metering mechanism located at the center of the tank.

Such movement of the product can be inefficient, and seed and/or fertilizer is often left behind when the volume in the tank becomes low. While this small amount of seed/or fertilizer does not substantially interfere with the ongoing operations of the air seeder, the seed or fertilizer that is left in the grain tank over extended periods of time, such as during storage of the air seeder between seasons, will likely spoil. This spoiled product will then be discharged from the air seeder the next time it is used, leading to contamination of the newly added product. Moreover, the spoiling or rotting process of the seed or fertilizer in the air seeder tank can be corrosive to the air seeder. Over time, the air seeder tank can be damaged and require repair. Additionally, any product that is left in the tank when the tank is switched to a different product will exit the air seeder with that new product. For example, if the tank has been used to dispense fertilizer, fertilizer will remain in the tank and will be intermingled with, for example, seeds when the tank is next used. This could be damaging to the seeds. Moreover, operators of air seeders demand that almost all product drain evenly from the tank with each use so that greater field efficiency can be achieved.

Further, it is desirable to increase the volume of the air seeder hopper so that more ground can be covered without having to stop and re-fill the tanks. However, if larger tanks are employed, the air seeder becomes unstable due to an excessive center of gravity. Additionally, in a large capacity two tank system, the optimal design would typically place the rear metering mechanism rearward over the axle. However, this causes interference both with clean out and with the location of the metering mechanism in a gravity fed tank. In order to translate the slopes and drain the tanks to one metering location, the tanks must be moved forward, thereby increasing the frame length and making the tanks even more unstable.

Accordingly, it would be desirable to provide a large capacity air seeder hopper which can carry a large volume of product and efficiently transport the product to the metering mechanism and overcome the aforementioned disadvantages of the current state of the art.

SUMMARY OF THE INVENTION

Accordingly, an important object of the present invention is to provide an auger for use in air seeder tanks to transfer particulate material such as seed or fertilizer to a metering mechanism for disposition to the ground.

It is another object of the present invention to provide an auger located along a trough incorporated into the bottom floor of the tank of the air seeder.

It is yet another object of this invention to locate the rear tank metering mechanism forward of the rear axle and in close proximity to the metering mechanism of the front tank.

It is a further object of the present invention initiation to provide sensors to indicate the grain level within the tanks or to sense a shortage of grain at the metering mechanism.

It is another object of the present invention provide a compact tank design to limit the physical tank size.

It is yet another object of this invention to provide motors to individually power each auger.

It is a further object of the present invention to reduce hopper depth.

It is an advantage of the present invention that the center of gravity in the tank is lowered, which stabilizes the air seeder.

It is another advantage of the present invention that the augers transfer the particulate material to the metering mechanisms only when required.

It is a further advantage of the present invention that the individual augers can be lifted to provide for a fast and easy cleanout.

It is a feature of the present invention that the floor of each individual tank is formed with a v-shaped configuration that converges into the metering mechanism.

It is another feature of this invention that the individual containers can be molded from noncorrosive plastic or single sheet metal.

It is yet another feature of the present invention that the slope of the floor of the individual tanks is shallow.

It is a further feature of this invention that the augers can be initiated in a response to a lowered torque as the particulate material drains from the flightings.

It is another feature of the present invention that the metering mechanisms are not centered on each tank.

It is still another feature of this invention to provide containers for an air seeder that are durable in construction, inexpensive to manufacture, easy to maintain, and simple and effective in use.

These and other objects, features, and advantages are accomplished according to the present invention by providing an air seeder having a frame, a pair of ground engaging wheels, a metering mechanism, and at least one container having at least one trough incorporated into the bottom floor with an auger rotatably mounted in each of the troughs for transporting particulate material along the floor of the container to the metering mechanism.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein:

FIGS. 5a–5g are schematic perspective views of the hopper;

DETAILED DESCRIPTION OF THE PREFERRED EMBODIMENTS

Figure 1:
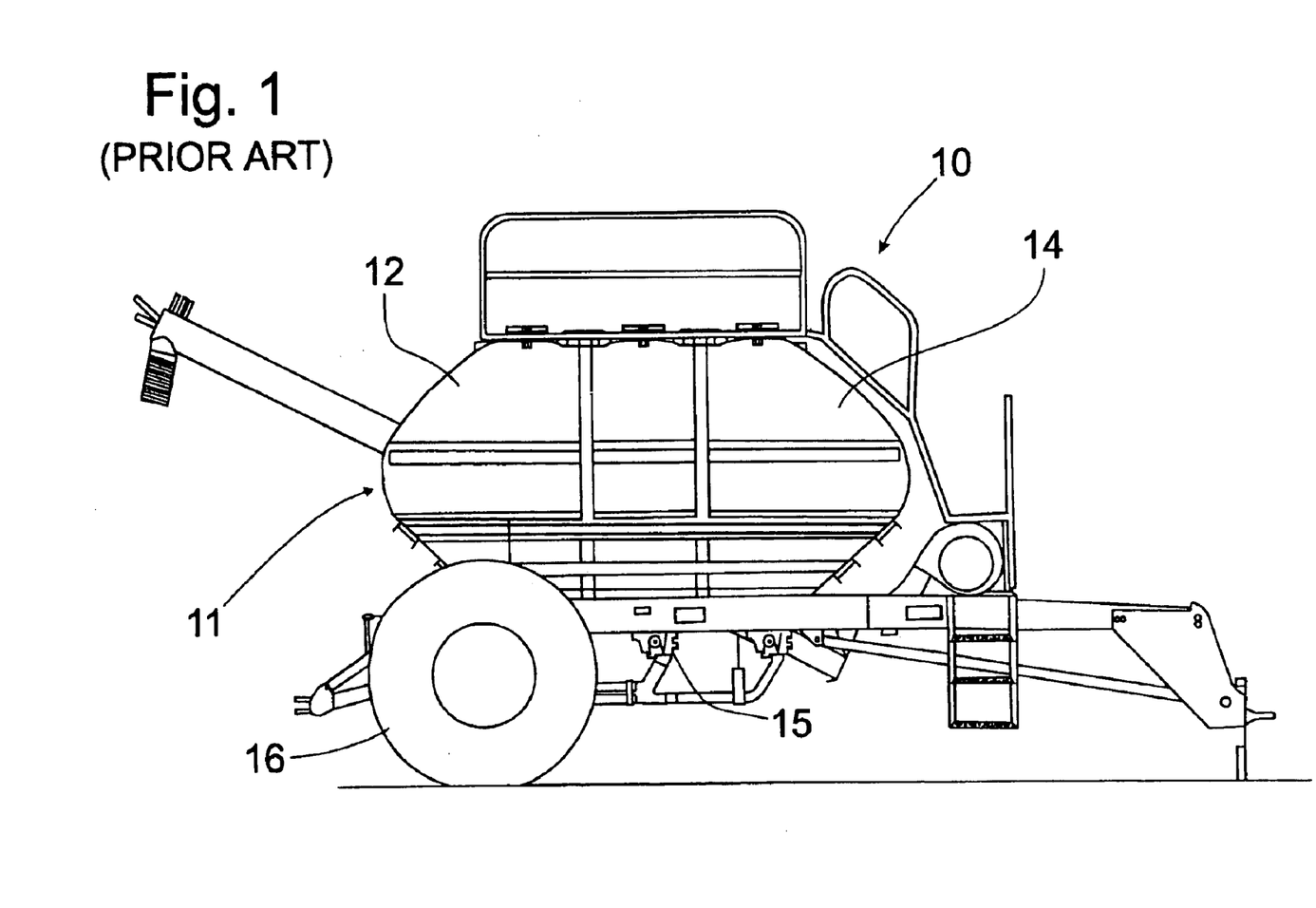
FIG. 1 is a side elevational of a prior art air seeder mechanism of a general type in which the principles of the present invention can be incorporated.
Figure 2:
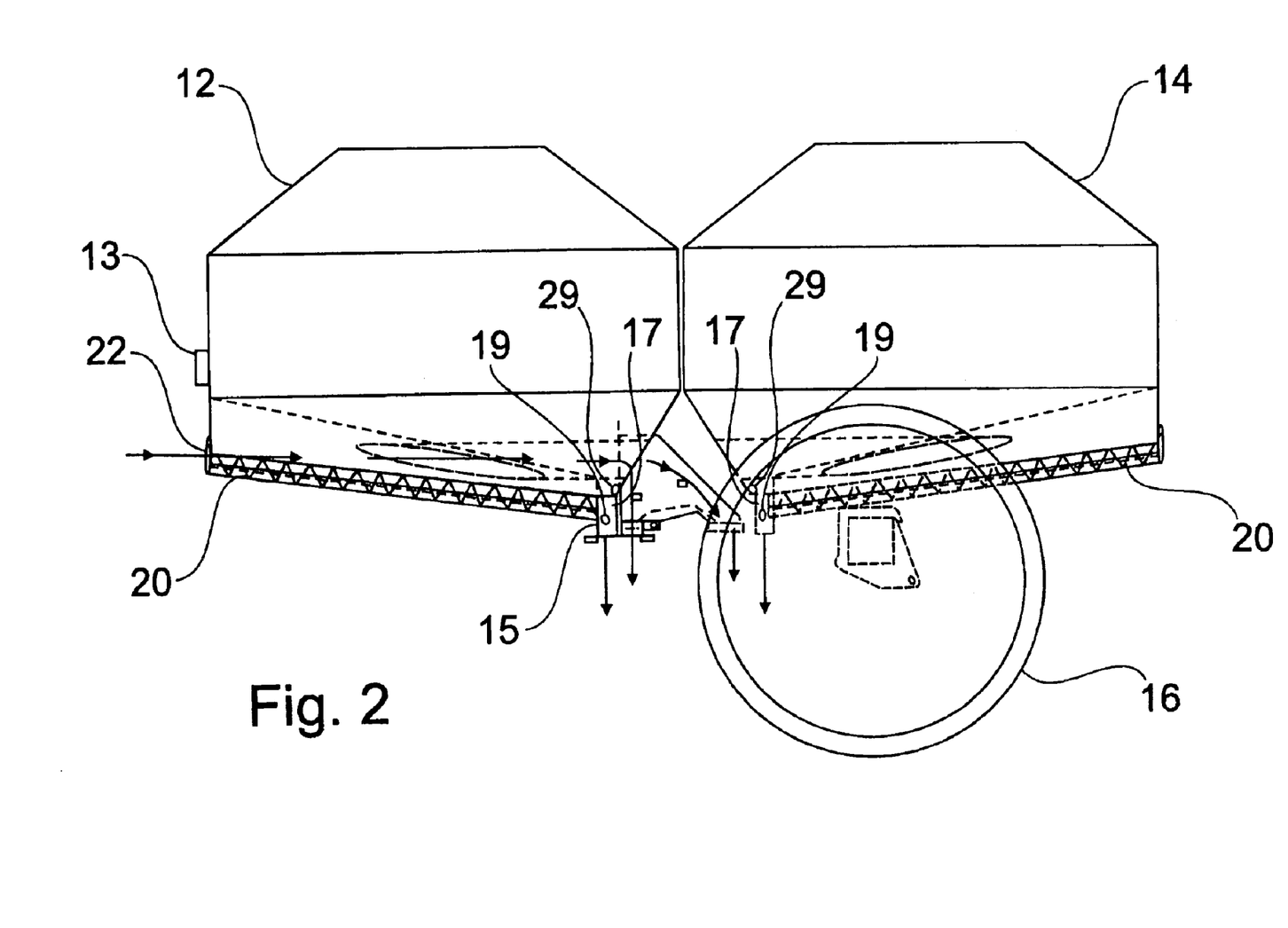
FIG. 2 is an enlarged partial side elevational view of an air seeder hopper incorporating the principles of the present invention, portions of the frame and hitch being removed for purposes of clarity.
Figure 3:
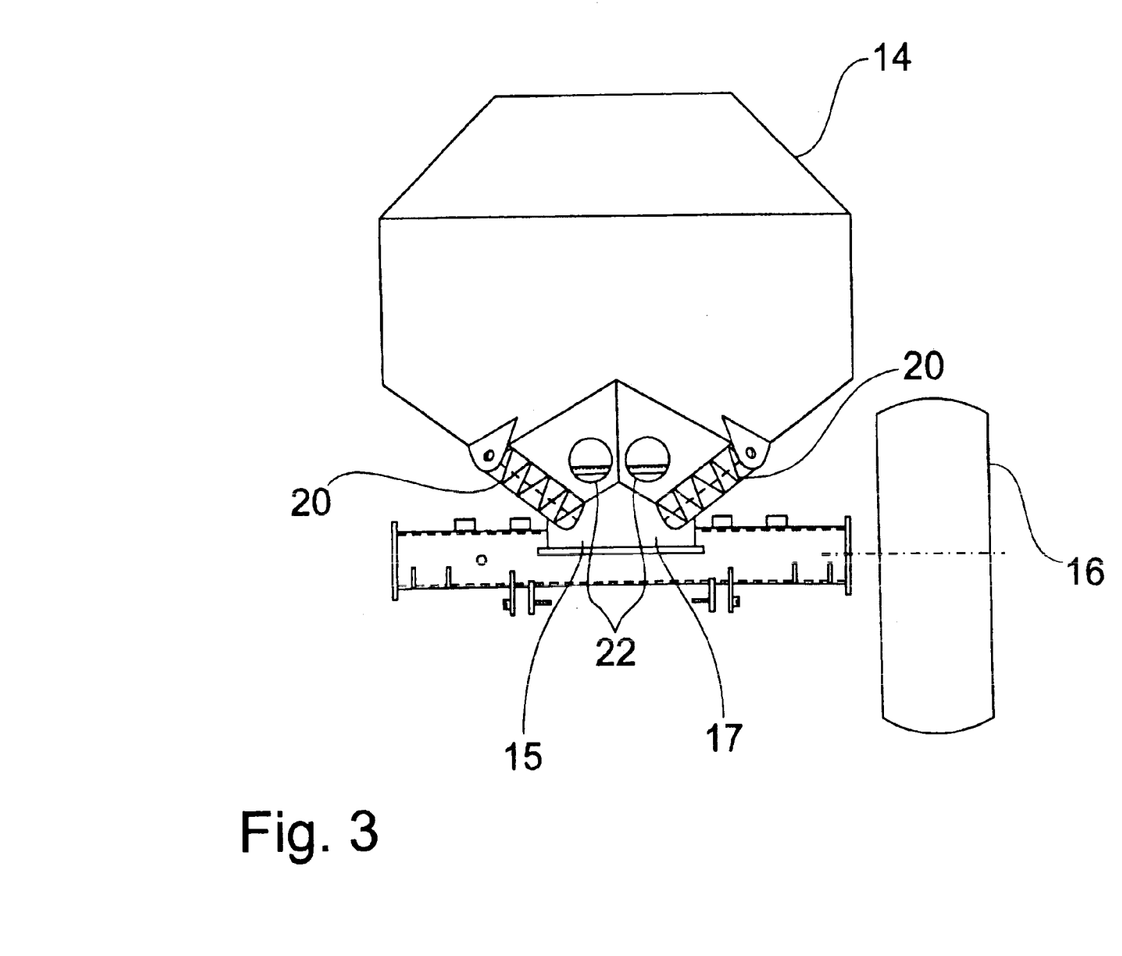
FIG. 3 is a partial front elevational view of the air seeder hopper corresponding to FIG. 1.
Figure 4:
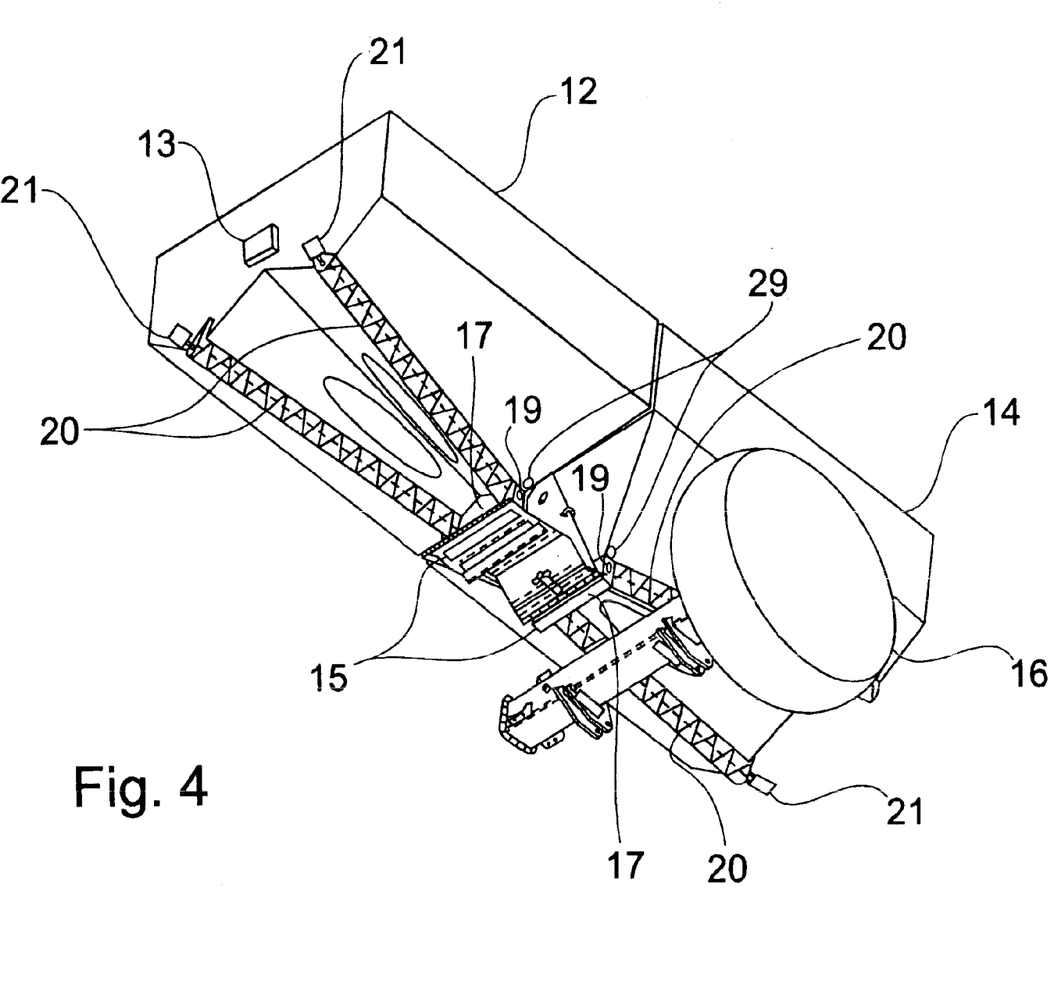
FIG. 4 is a partial underside perspective view of the air seeder hopper corresponding to FIGS. 2 and 3.
Figure 5A:
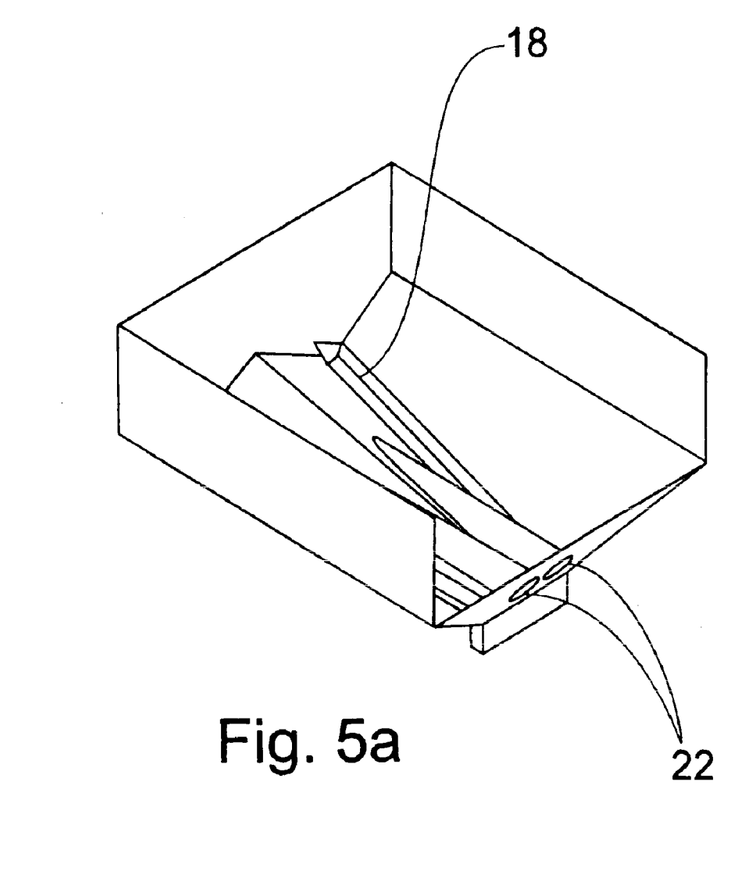
Figure 5B:
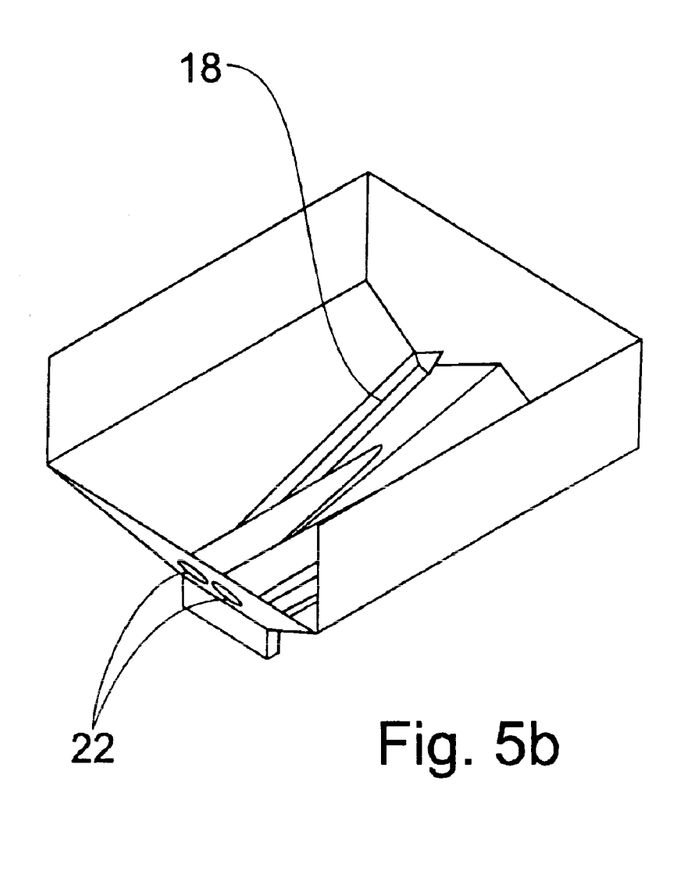
Figure 5C:
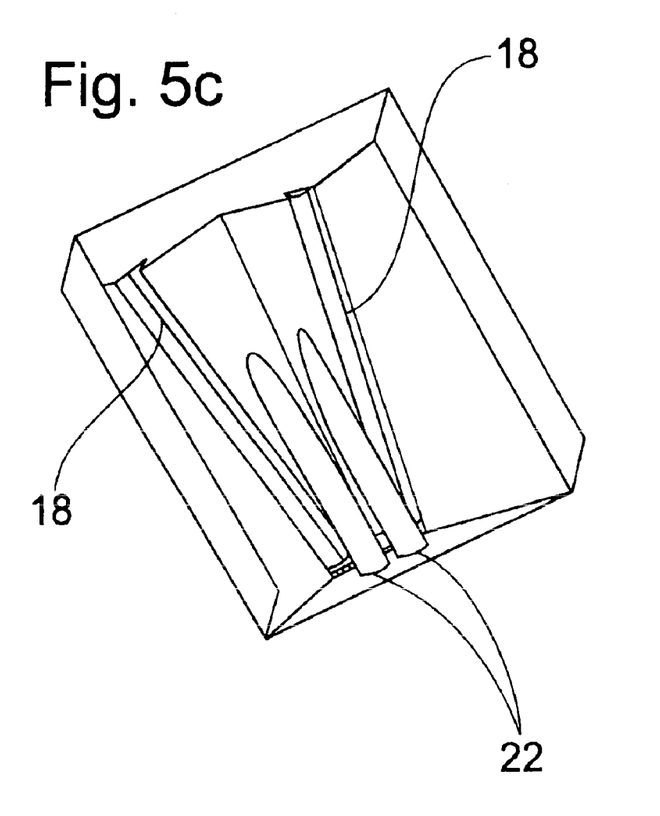
Figure 5D:
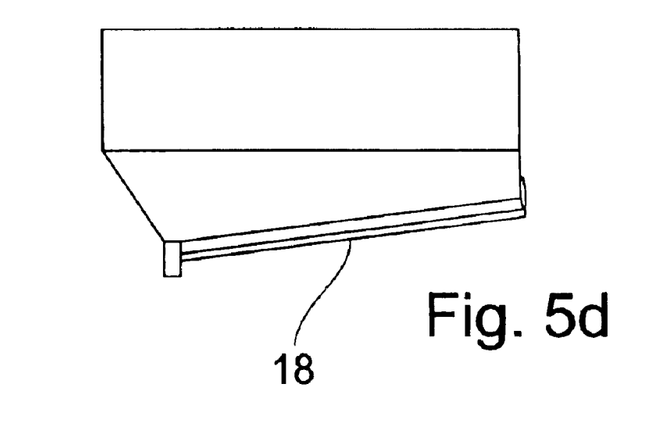
Figure 5E:
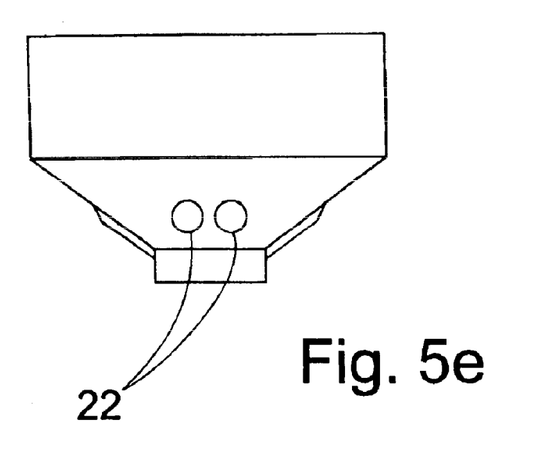
Figure 5F:
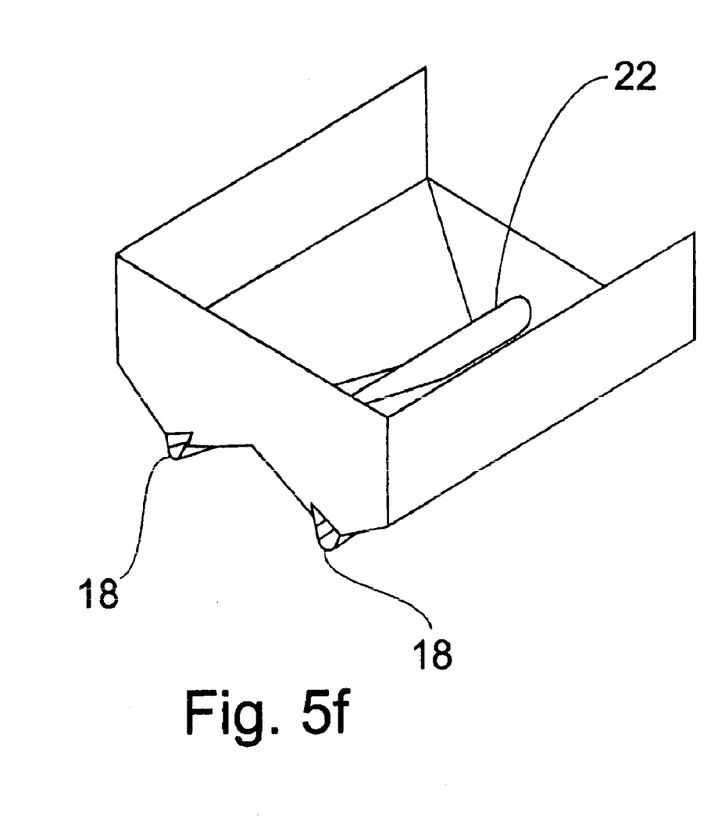
Figure 5G:
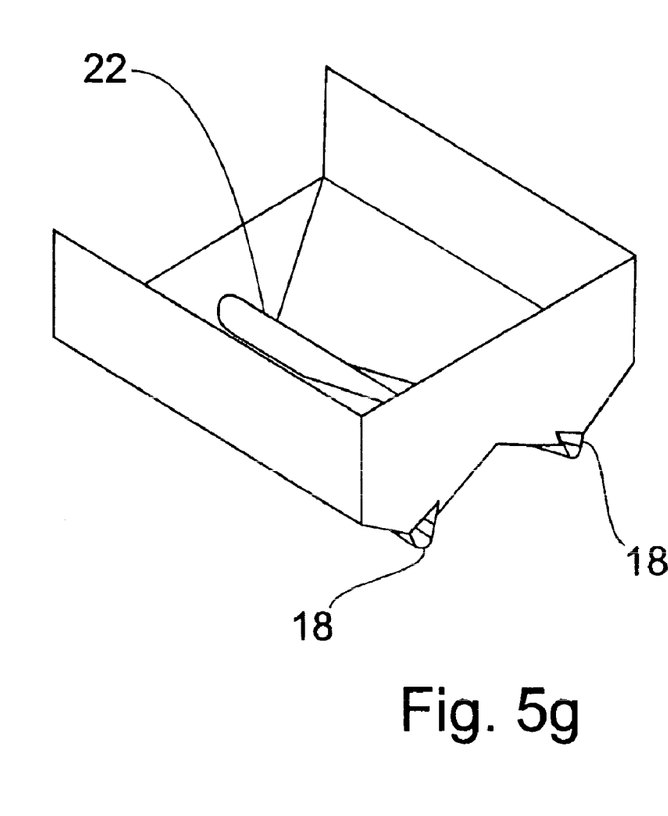

Referring now to FIGS. 1–4, the details of an air seeder hopper incorporating the principles of the present invention can best be seen. The air cart 10 preferably has a large capacity tank 11 of one or preferably two container configuration. The two individual containers 12, 14, as shown in FIGS. 2–4, are mounted on a frame mechanism 15 which is supported by ground engaging wheels 16 for mobile movement over the ground. Each container 12, 14 is preferably formed from molded plastic and is capable of being pressurized. Preferably, each container 12, 14 is capable of being pressurized at a different operating pressure from the other container. Furthermore, each container 12, 14 must be capable of operating under different levels of fullness. For example, fertilizer in one container and seed in another container will not necessarily empty at the same rate, particularly for different types of seeds that can be planted.

Each container 12, 14 is provided with a metering mechanism 15 of generally conventional configuration, but positioned near a distal end of the container. Because of the large capacity of the container, and the requisite positioning of the metering mechanism 15 at the interior end of the container, so as to be positionable adjacent of the metering mechanism of the opposing container near the center of the tank, the slope of the floor of the individual containers 12, 14 is shallow, or even flat. To move particulate material, such as fertilizer or seed, within the container to the metering mechanism 15, an auger 20 is located along a trough 18 incorporated into the bottom floor of the individual container 12, 14.

A supply of air from a remote fan mechanism as represented in FIG. 1 can be delivered to the metering mechanism 15 by conveying tubes 22 that can pass at least partially internally of the individual container 12, 14, as is shown in FIGS. 2 and 3. Preferably the air supply for both metering mechanisms for the two containers 12, 14 will come from a single fan mechanism (not shown) and be distributed to appropriately placed conveying tubes 22 to receive particulate material delivered through the metering mechanisms 15 for conveyance thereof to the planters as shown in FIG. 1. Since both containers 12, 14 are commonly manufactured, the conveying tubes 22 may be present in the rear container 14, although not be connected to a fan mechanism to provide a supply of air.

Figure 7:
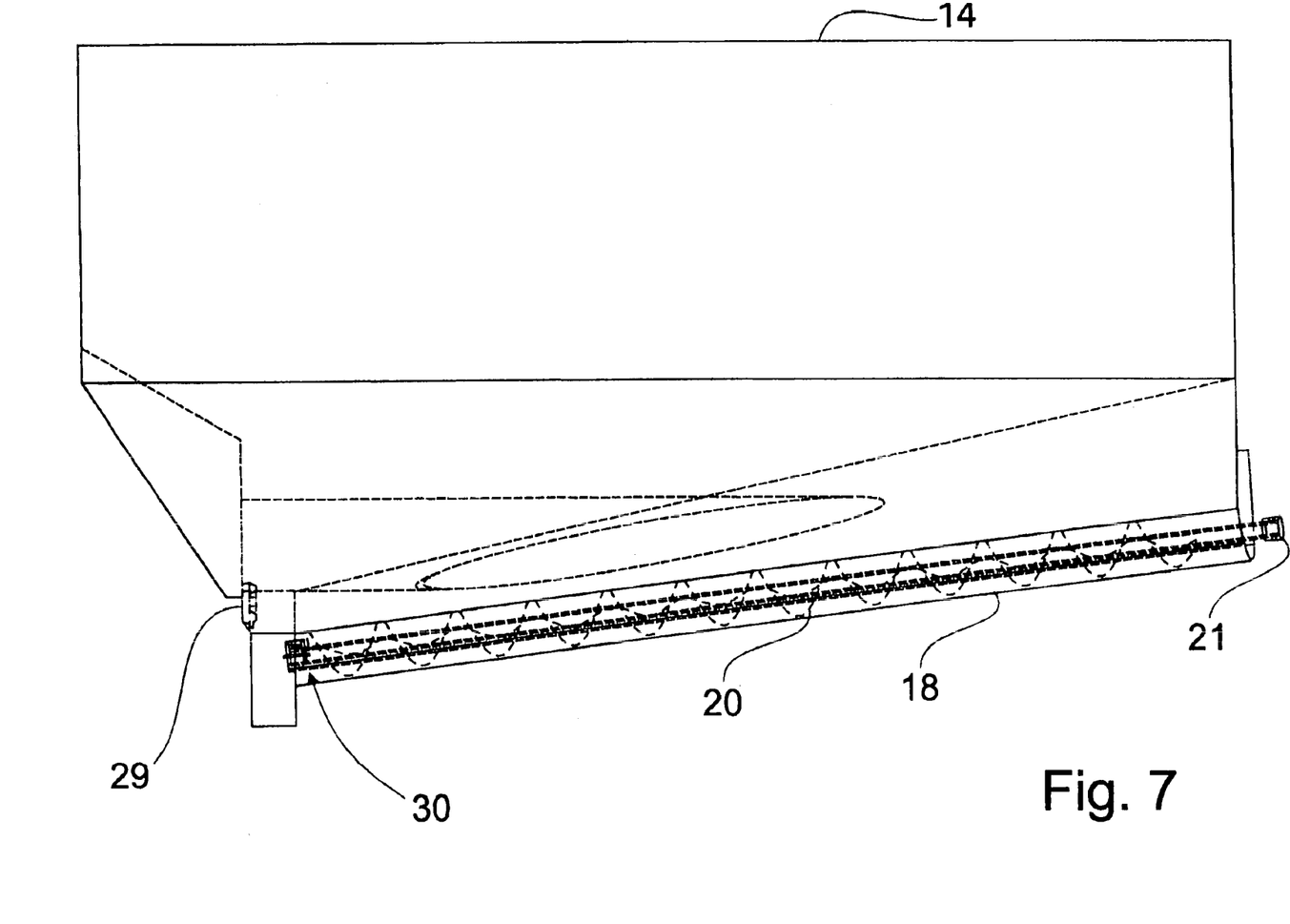
FIG. 7 is a schematic elevational view of an air seeder hopper illustrated in FIG. 2 showing the auger in a working position.
Figure 8:
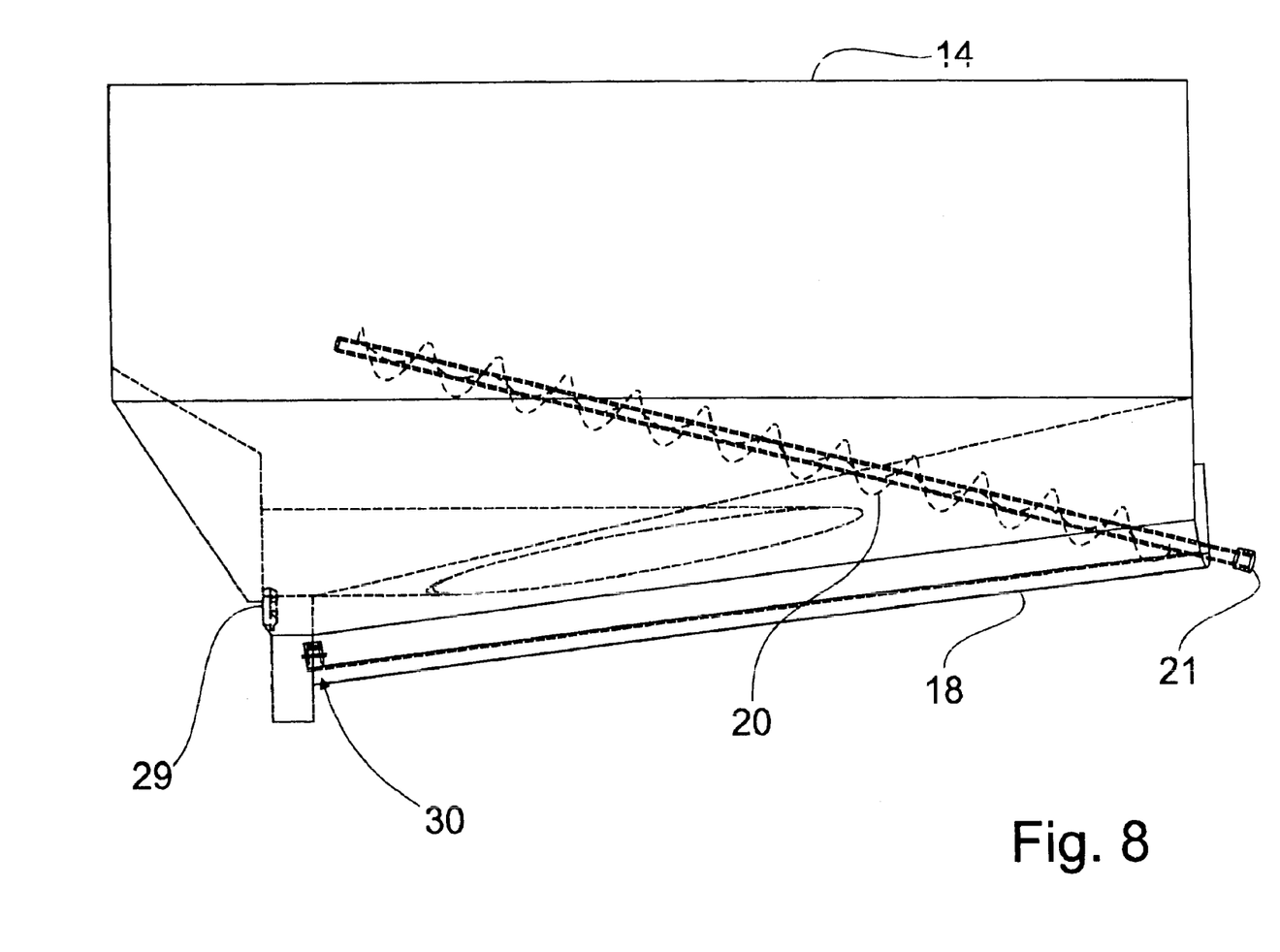
FIG. 8 is a schematic elevational view of an air seeder hopper illustrated in FIG. 2 showing the auger in a clean out position.

As is best seen in FIGS. 3, 4 and 5a–5g, the floor of each individual container is formed with a double v-shaped configuration converging into the metering mechanism 15. At the lower apex of each v-shaped configuration, a trough 18 is provided in which an auger 20 is rotatably mounted to convey grain or other particulate material along the bottom of the floor into the metering mechanism 15. Preferably, there is an auger 20 located in each of the troughs 18 in the containers 12, 14. The v-shaped configuration of the floor facilitates the movement of particulate material into the auger 20 for conveyance to the metering mechanism 15. As is best seen in FIGS. 4, 7 and 8, each auger 20 is individually powered by a motor 21 mounted on the distal end of the auger 20 compared to the metering mechanism 15. Preferably, these motors are hydraulically driven; however, they could be driven electrically or pneumatically as well.

Preferably the floor of the container is sloped toward the metering mechanism 15 from the distal end thereof to enable a gravity flow of product within the container into the metering mechanism 15. The augers 20 in such a configuration will be utilized only to convey product within the container as a result of insufficient gravity flow into the metering mechanism. Thus, the augers 20 are rotated by the motors 21 only when required to convey product into the metering mechanisms 15.

To control the operation of the individual augers 20, a sensor 19 is incorporated into a product supply box 17 forming part of the metering mechanism 15. When the sensor 19 indicates a shortage of product to be dispensed through the metering mechanism 15, a controller 13 initiates rotation of the motors 21 to convey product from the hopper into the product supply box 17 of the metering mechanism 15, thus filling the metering mechanism 15 as needed to maintain proper operation thereof. When a sufficient supply of product is present in the metering mechanism 15, the sensor 19 stops the rotation of the auger 20.

Figure 6:
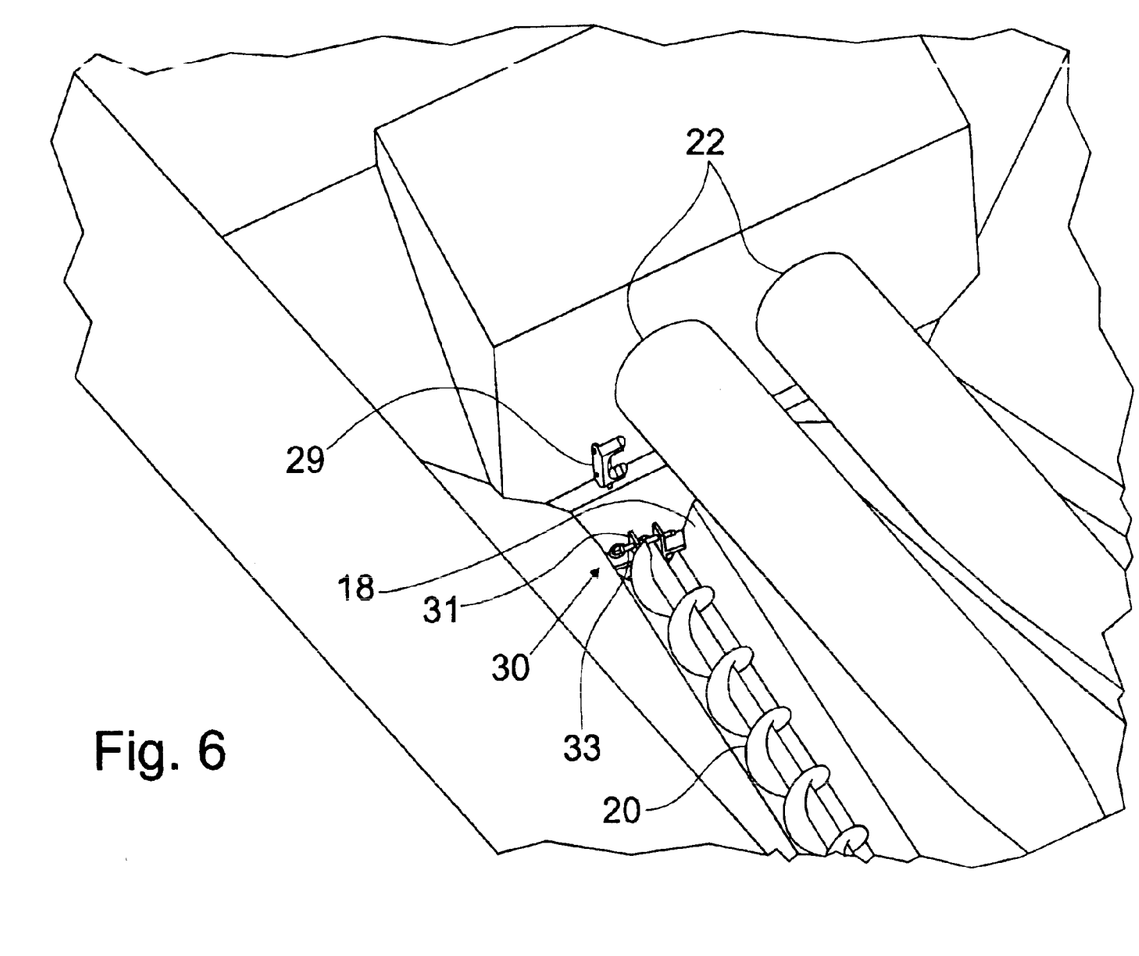
FIG. 6 is a partial perspective view of an air seeder hopper showing the location of an optical sensor.

Alternatively, as illustrated in FIG. 6, initiation of the drive of the augers 20 can be the response of a signal from an optical sensor 29 indicating the grain level within the container or by sensing lowered torque requirements to effect rotation of the auger as grain, or other products, drains from above the flightings of the augers.

Although the slope of the container 12, 14 and the use of augers 20 removes most of the particulate material from the containers 12, 14 during operation, some residual particulate material remains in the tank. As shown in FIG. 7, when the auger 20 is in the working position, the auger 20 is located at the bottom of trough 18. However, as illustrated in FIG. 8, to completely clean out the containers 12, 14, the augers 20 are lifted at the non-driving end and the containers 12, 14 are manually swept clean.

In a preferred embodiment, the augers 20 are released by an easy release mechanism 30, as illustrated in FIGS. 6–8. The easy release mechanism 30 includes a u-shaped bracket 31 having a pair of upwardly extending arms with holes therein to receive a pin 33. When the pin 33 is inserted through the holes, the easy release mechanism 30 is in a closed and locked position. As a result, the auger 20 remains placed in the trough 18 in the working position. To clean out the containers 12, 14, the operator simply removes the pin 33 from the u-shaped bracket 31 and raises the auger 20 for manual clean out as described above.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. A method of conveying particulate material from an air seeder having a container with a floor for holding a supply of said particulate material and a metering mechanism for dispensing said particulate material, comprising the steps of:
   allowing said particulate material within said container to drain by gravity into said metering mechanism;
   sensing a shortage of supply of said particulate material to be dispensed from said metering mechanism as a result of said allowing step; and
   rotating an auger housed within a trough in a floor member of said container to deliver any remaining particulate material within said container to said metering mechanism.

2. The method of claim 1, wherein said sensing step includes sensing a lack of sufficient supply of particulate material within said metering mechanism.

3. The method of claim 1, wherein said sensing step includes sensing a predetermined level of supply of particulate material within said container with an optical sensor.

4. The method of claim 1, wherein said allowing step is enhanced by the shape of said floor of said container to drain particulate material both vertically and horizontally into said metering mechanism.

5. The method of claim 4, wherein said rotating step is accomplished by initiating a motor connected to an end of said auger remote from said metering mechanism.

6. The method as recited in claim 1, further including pressurizing the container.

7. The method of claim 6, wherein the step of pressuring is provided by a fan mechanism connected to provide a supply of air to the container.

8. The method of claim 1, wherein the metering mechanism is located at one end of the container and the floor of the container is sloped from a distal end of the container relative thereto toward the metering mechanism.

9. The method of claim 1, wherein the step of rotating the auger is performed only when the step of sensing indicates a shortage of supply of said particulate material to be dispensed through the metering mechanism.

10. The method of claim 1, wherein the floor includes a first V-shaped configuration and a second V-shaped configuration converging at the metering mechanism, and the trough is located at a lower apex of each of the first and second V-shaped configurations.

11. The method of claim 1, further including the steps of:
    sensing a sufficient supply of said particulate material to the metering mechanism; and
    stopping rotation of auger in response to the step of sensing the sufficient supply of said particulate material to the metering mechanism.

12. The method as recited in claim 1, wherein the step of sensing the shortage of supply of said particulate material is performed in a product box of the metering mechanism; and further including the step of conveying said particulate material from the container into the product supply box of the metering mechanism.

13. A method of conveying particulate material from an air seeder having a container with a floor for holding a supply of said particulate material and a metering mechanism for dispensing said particulate material, comprising the steps of:
    allowing said particulate material within said container to drain by gravity into said metering mechanism;
    sensing a shortage of supply of said particulate material to be dispensed from said metering mechanism as a result of said allowing step; and
    rotating an auger housed within a trough in a floor member of said container to deliver any remaining particulate material within said container to said metering mechanism,
    wherein said sensing step includes sensing a lowered torque requirement to effect rotation of said auger.

14. The method of claim 13, wherein the metering mechanism is located at one end of the container and the floor of the container is sloped from a distal end of the container relative thereto toward the metering mechanism.

15. The method of claim 13, wherein the step of rotating the auger is performed only when step of sensing indicates a shortage of particulate material to be dispensed through the metering mechanism.

16. The method of claim 13, wherein the floor includes a first V-shaped configuration and a second V-shaped configuration converging at the metering mechanism, wherein the trough is located at a lower apex of each of the first and second V-shaped configurations, and wherein the rotating step includes rotating each auger so as to deliver the particulate material for dispensing by the metering mechanism.

17. The method of claim 13, further including the step of receiving said particulate material from the metering mechanism with a supply of air.

18. A method of conveying particulate material from an air seeder having a container with a floor for holding a supply of said particulate material and a metering mechanism for dispensing said particulate material, comprising the steps of:
    allowing said particulate material within said container to drain by gravity into said metering mechanism;

sensing a shortage of supply of said particulate material to be dispensed from said metering mechanism as a result of said allowing step; and rotating an auger housed within a trough in a floor member of said container to deliver any remaining particulate material within said container to said metering mechanism, wherein said air seeder is provided with at least two containers for housing different particulate material, said allowing, sensing and rotating steps being accomplished independently within each said respective containers.

19. The method of claim 18, wherein each of the at least two containers is mounted on a frame mechanism supported by a plurality of ground engaging wheels, and further including the step of moving the containers across the ground.

20. The method of claim 18, wherein the first container includes a supply of a seed material, and the second container includes a supply of a fertilizer material.

* * * * *